(12) United States Patent
Shen et al.

(10) Patent No.: US 9,753,841 B1
(45) Date of Patent: Sep. 5, 2017

(54) GENERATION OF BASELINE TEST CASES FOR COMPOSITE SOFTWARE APPLICATION

(71) Applicant: CA, Inc., New York, NY (US)

(72) Inventors: Tony Shen, Beijing (CN); Kevin Liu, Beijing (CN); XunXiao Wang, Beijing (CN); Bolt Zhang, Beijing (CN)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 14/579,502

(22) Filed: Dec. 22, 2014

(51) Int. Cl.
*G06F 9/44* (2006.01)
*G06F 11/36* (2006.01)
*H04L 29/06* (2006.01)

(52) U.S. Cl.
CPC ............ *G06F 11/368* (2013.01); *H04L 67/42* (2013.01)

(58) Field of Classification Search
None
See application file for complete search history.

(56) References Cited

U.S. PATENT DOCUMENTS

2005/0166094 A1* 7/2005 Blackwell ........... G06F 11/3664 714/38.14

OTHER PUBLICATIONS

Hewlett Packard. "HP Unified Functional Testing software." Data Sheet, Retrieved from the Internet: URL: http://h20195.www2.hp.com/V2/GetPDF.aspx/4AA4-8360ENW.pdf [Retrieved on Oct. 31, 2014]; Mar. 2014; pp. 1-8.

Hewlett Packard. "Survival guide for testing modern applications." Business White Paper; Retrieved from the Internet: URL:http://www8.hp.com/h20195/v2/GetPDF.aspx%2F4AA3-5237EEW.pdf [Retrieved Oct. 31, 2014]; Created Jun. 2011, Updated Apr. 2012; pp. 1-8.

Krishna et al. "Automated Interface Test Framework" IBM Service Oriented Intergration (SOI) services; Retrieved from the Internet: URL:http://www.ibm.com/developerworks/library/ws-intefacetestframe/ [Retrieved Dec. 22, 2014]; Apr. 14, 2010; pp. 1-20.

Parasoft. "Automatic Java Software and Component Testing: Using Jtest to Automate Unit Testing and Coding Standard Enforcement" Retrieved from the Internet: URL:http://www.parasoft.com/products/article.jsp?articleId=839 [Retrieved Dec. 22, 2014]; Mar. 8, 2002; pp. 1-19.

(Continued)

*Primary Examiner* — Qamrun Nahar
(74) *Attorney, Agent, or Firm* — Coats & Bennett, PLLC (57) ABSTRACT

According to a computer-implemented method, a determination is made of content of an inbound request that is received at a composite software application from a client. The composite software application utilizes features from an application component that is deployed independently from the composite software application. A determination is made of content of an outbound request that is transmitted from the composite software application to the application component, with the outbound request being triggered by the inbound request. A determination is also made of content of a response to the inbound request that is transmitted from the composite software application to the client. The content of each of the inbound request, the response to the inbound request, and the outbound request are recorded in a repository as a baseline test case for regression testing of the composite software application.

21 Claims, 7 Drawing Sheets

(56) References Cited

OTHER PUBLICATIONS

Reactive Systems, Inc. "Finding Bugs in C Programs with Reactis for C." Retrieved from the Internet: URL:http://www.reactive-systems.com/c-regression-testing.html [Retrieved Dec. 22, 2014]; Aug. 29, 2011; pp. 1-19.

Smartbear Software. "Regression Testing." Retrieved from the Internet: URL:http://support.smartbear.com/articles/testcomplete/regression-testing [Retrieved Dec. 22, 2014]; 2014; pp. 1-5.

Easymock. "Easy mocking. Better testing." Retrieved from the Internet: URL:http://easymock.org/ [Retrieved Dec. 22, 2014] 2001' pp. 1-2.

* cited by examiner

GENERATION OF BASELINE TEST CASES FOR COMPOSITE SOFTWARE APPLICATION

TECHNICAL FIELD

The present disclosure relates to regression testing, and more particularly relates to creating a baseline test case for use in regression testing of a composite software application.

BACKGROUND

A composite software application utilizes features from multiple distributed software application components. The application components are deployed independently from the main composite application in a distributed fashion, across one or more servers and one or more operating system platforms. The composite application exchanges data with its application components via inter-process communication (e.g., using a defined communication protocol). In some instances, the application components may provide business functions. Use of application components can enable a vendor to offer functionality from a third party service provider (e.g., a third party payment processing system) and/or to share functionality between multiple composite software applications.

A requests submitted to a composite software application causes the composite software application to generate a response to the request, and may also cause the composite software application to generate additional outbound requests for the application components. For example, in an e-commerce environment, a composite application may include a web application on an e-commerce website, and application components for that composite application could include a third party credit card payment system, an inventory management system, etc. for processing orders. The inter-process communication could occur over a variety of protocols.

Regression testing is a type of software testing that seeks to uncover new software bugs ("regressions") in existing software features after changes have been made. Regression testing is based on the understanding that updates to one portion of a software application can sometimes cause unpredictable behavior in other areas of the software application. Regression testing is used to detect such issues.

SUMMARY

According to one aspect of the present disclosure, a computer-implemented method is disclosed in which a determination is made of content of an inbound request that is received at a composite software application from a client. The composite software application utilizes features from an application component that is deployed independently from the composite software application. A determination is made of content of an outbound request that is transmitted from the composite software application to the application component, with the outbound request being triggered by the inbound request. A determination is also made of content of a response to the inbound request that is transmitted from the composite software application to the client. The content of each of the inbound request, the response to the inbound request, and the outbound request are recorded in a repository as a baseline test case for regression testing of the composite software application.

According to another aspect of the present disclosure, a computing device is disclosed that includes a communication interface and a processing circuit that is communicatively connected to the communication interface. The communication interface is configured to communicate with a composite software application. The processing circuit is configured to determine content of an inbound request that is received at the composite software application from a client. The composite software application utilizes features from an application component that is deployed independently from the composite software application. The processing circuit is further configured to determine content of an outbound request that is transmitted from the composite software application to the application component, with the outbound request being triggered by the inbound request. The processing circuit is further configured to determine content of a response to the inbound request that is transmitted from the composite software application to the client. The processing circuit is further configured to record the content of each of the inbound request, the response to the inbound request, and the outbound request in a repository as a baseline test case for regression testing of the composite software application.

According to another aspect of the present disclosure, a computer program product is disclosed that include a computer readable storage medium having computer readable program code embodied therewith. The computer readable program code includes computer readable program code configured to determine content of an inbound request that is received at a composite software application from a client. The composite software application utilizes features from an application component that is deployed independently from the composite software application. The computer readable program code also includes computer readable program code configured to determine content of an outbound request that is transmitted from the composite software application to the application component, with the outbound request being triggered by the inbound request. The computer readable program code also includes computer readable program code configured to determine content of a response to the inbound request that is transmitted from the composite software application to the client. The computer readable program code also includes computer readable program code configured to record the content of each of the inbound request, the response to the inbound request, and the outbound request in a repository as a baseline test case for regression testing of the composite software application.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The present disclosure describes techniques for generating baseline test cases for a composite software application. Previously, baseline test cases for composite software applications have only included inbound requests (e.g., from a client to the composite software application), and responses (e.g., from the composite software application back to the client), without including outbound requests from the composite software application to application components. During an automated regression testing cycle, only the inbound request and its response would be checked for regression errors. This has failed to account for situations where an inbound request generates not only a response but also generates one or more outbound requests to application components which are possibly run by third parties. To make sure there are no regression issues, only checking the response is insufficient. The techniques discussed herein augment baseline test cases to include outbound requests to application components, which provides for more robust regression testing of composite software applications.

In some embodiments, the inbound requests, outbound requests, and responses may be obtained in different ways depending on a mode of operation. For example, in some embodiments, in a first mode of operation content of outbound requests to the application component is determined by receiving an intercepted copy of the outbound requests transmitted to the application component, and in a second mode of operation content of outbound requests to the application component is determined by querying the application component to determine what outbound requests have been received by the application component.

Figure 1:
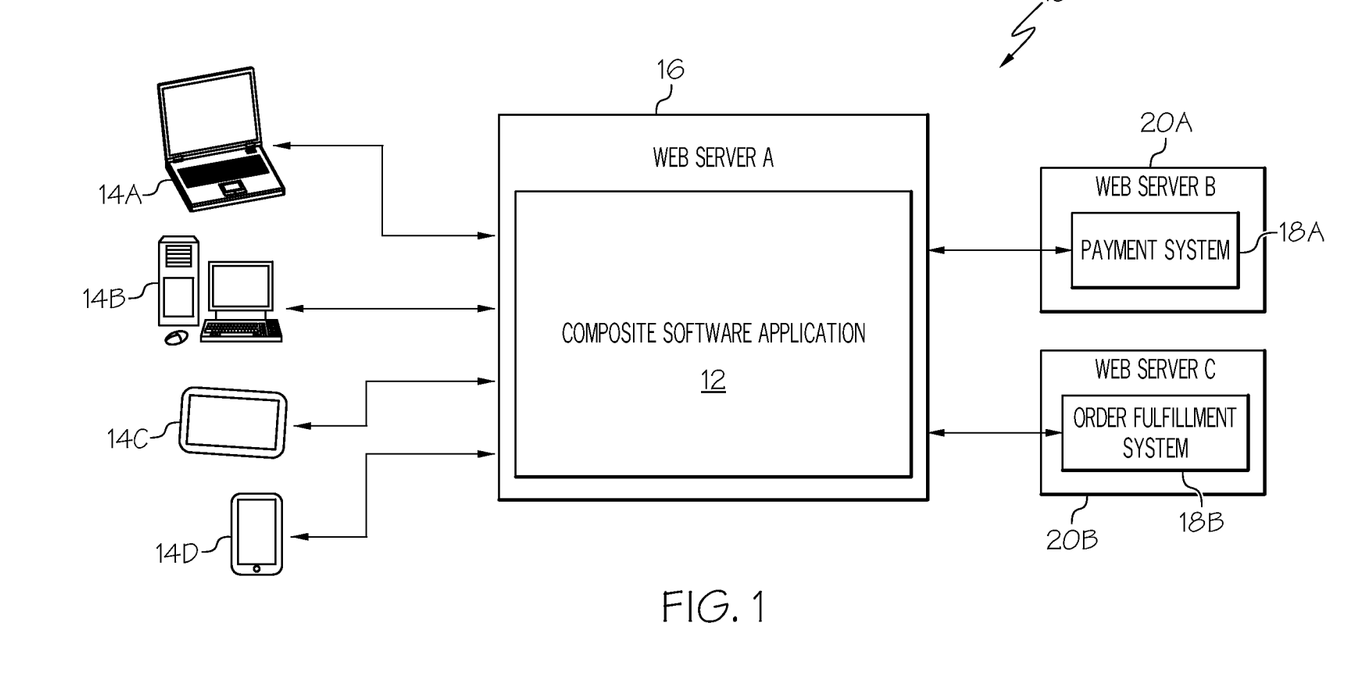
FIG. 1 illustrates an example system in which a composite software application interacts with a plurality of clients and a plurality of application components.

FIG. 1 illustrates an example system 10 in which a composite software application 12 interacts with a plurality of clients 14A-D and a plurality of application components 18A, 18B. Assume for the discussion below that the composite software application 12 is an e-commerce web application through which orders can be placed for products. In the example of FIG. 1, the clients 14A-D may interact with the composite software application 12 through a web browser, or a dedicated application, for example. The composite software application 12 is hosted on a webserver 16. The composite software application 12 includes multiple application components 18A, 18B that are hosted on webservers 20A and 20B, respectively. Assume that application component 18A is a payment system (e.g., a third party credit card processing system), and that application component 18B is an order fulfillment system. When one of the clients 14 requests to place an order with the composite software application 12, the composite software application 12 interacts with the payment system 18A and order fulfillment system 18B to complete the order. This could include, for example, requesting that payment system 18A process a credit card payment, and requesting that order fulfillment system 18B update an order database and/or sends an order confirmation email. This is illustrated in greater detail in FIG. 2.

Figure 2:
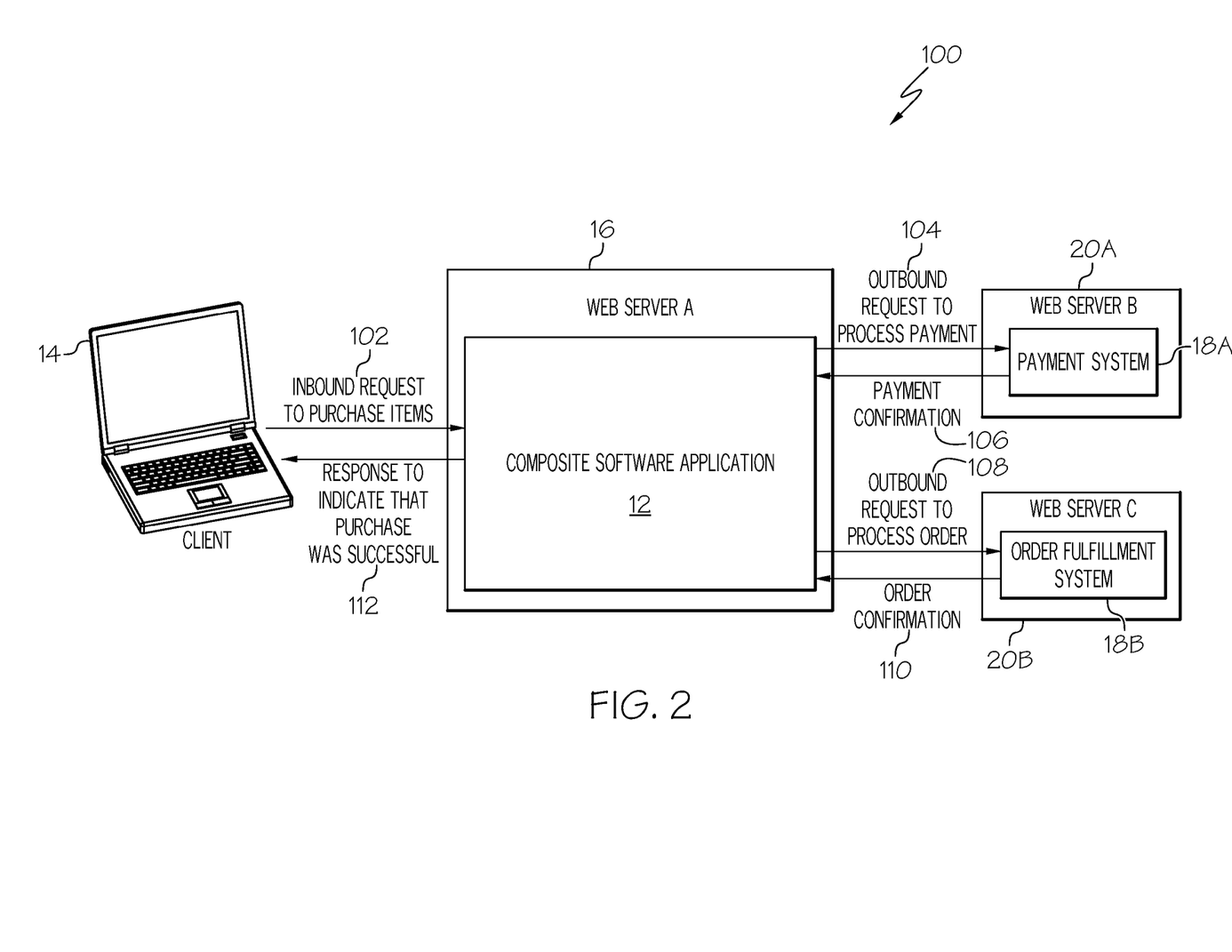
FIG. 2 illustrates a simplified signaling diagram describing how an inbound request to the composite application can trigger a response and one or more outbound requests.

FIG. 2 illustrates a simplified signaling diagram 100 describing how an inbound request to the composite application 12 can trigger a response and one or more outbound requests. An inbound request (102) is received at the composite software application 12 which requests to purchase one or more items. Based on the inbound request 102, the composite software application 12 transmits an outbound request (104) to the payment system 18A to process payment, and a successful payment confirmation (106) is received. The composite software application then transmits an additional outbound request (108) to order fulfillment system 18B, and a successful confirmation (110) is received indicating, e.g., that an order confirmation email has been sent to the client 14. The composite software application 12 then transmits a response (112) to the client 14 indicating that the requested purchase was successful.

Figure 3:
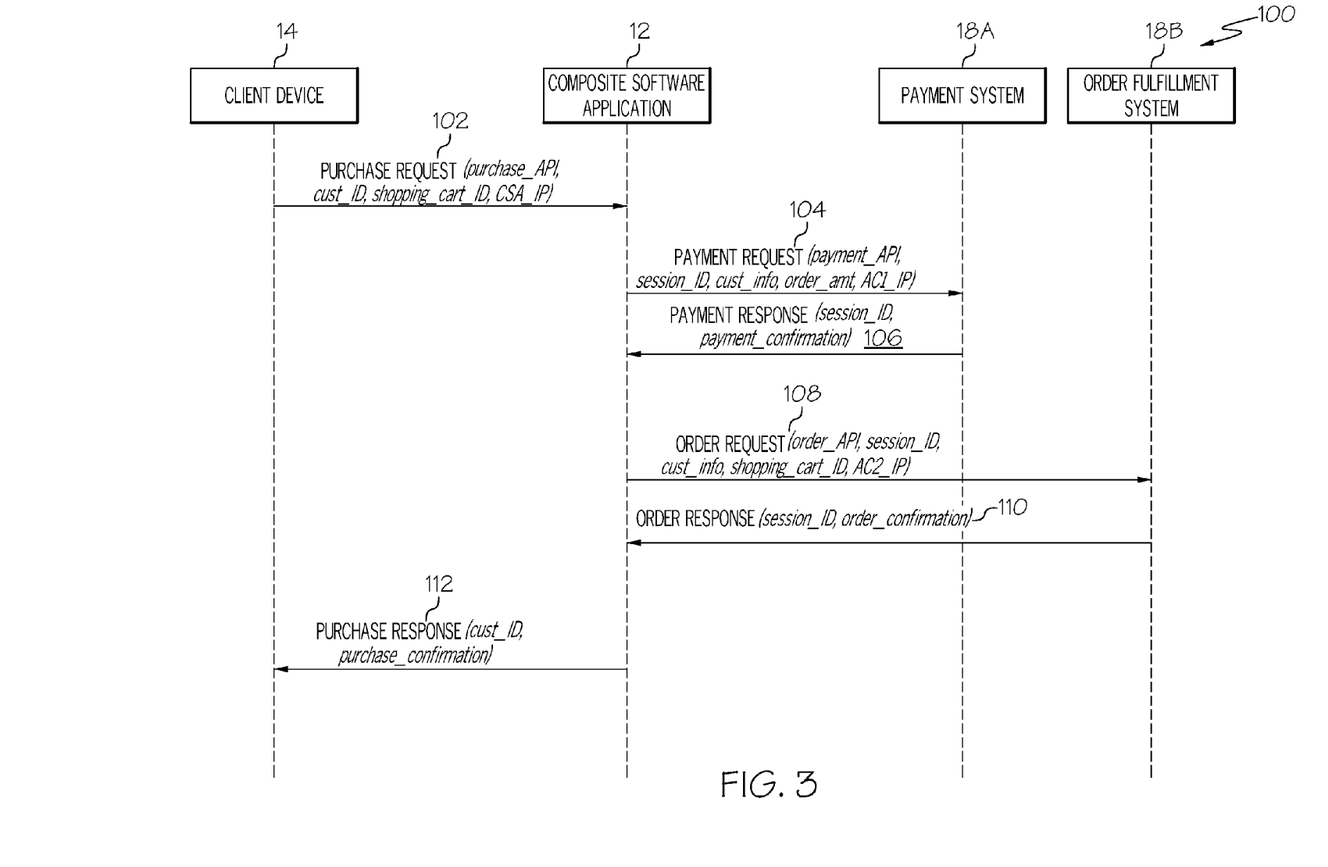
FIG. 3 illustrates a more detailed version of the signaling diagram of FIG. 2.

FIG. 3 illustrates a more detailed version of the signaling diagram 100 of FIG. 2 according to an example embodiment. The composite software application 12 receives an inbound request (102) from a client device 14 which is a purchase request that includes the following parameters:

"purchase_API" which identifies an application programming interface (API) of the composite software application 12 for initiating an order;

"cust_ID" which identifies a particular customer that is a user of the composite software application at the client 14;

"shopping_cart_ID" which identifies a customer's shopping cart within the composite software application 12; and "CSA_IP" which identifies an Internet Protocol (IP) address of the composite software application 12 (or a domain name that points to the IP address).

In some embodiments, the inbound request is received at the composite software application 12 via a graphical user interface (GUI) of the composite software application 12.

Based on the inbound request 102, the composite software application 12 transmits outbound requests 104 and 108, each of which is discussed below. Outbound request 104 requests that the "payment system" 18A application component processes payment for the purchase. The outbound request 104 includes the following parameters:

"payment_API" which identifies an API of the payment system 18 for processing a payment;

"session_ID" which identifies a session of the composite software application 12 for processing the purchase request 104;

"cust_info" which identifies the customer (e.g., name and address and credit card information for the cust_ID);

"order_amt" which identifies a total amount to be charged to the user for the purchase; and "AC1_IP" which identifies an IP address of the "payment system" application component 18A (or a domain name that points to the IP address).

The payment system 18A successfully processes the payment, and transmits a payment response 106 that includes the following parameters:

"session_ID"; and

"payment_confirmation" which indicates that the payment was successful.

The composite software application 12 then sends an additional outbound request 108 to the order fulfillment system 18B application component to complete the order. The outbound request 108 includes the following parameters:

"order_API" which identifies an API of the order fulfillment system 18B to processing an order (e.g., for generating an order confirmation email, creating a packing slip, etc.);

"session_ID";

"cust_info";

"shopping_cart_ID"; and

"AC2_IP" which identifies an IP address of the "order fulfillment system" 18B application component (or a domain name that points to the IP address).

The order fulfillment system 18B successfully processes the order, and transmits an order response 110 that includes the following parameters:

"session_ID"; and

"order_confirmation" which indicates that the order has been successfully processed.

The order being successfully processed could mean any of the following: that the item(s) purchased are in stock, that an order confirmation email was transmitted, that a packing slip was generated, etc., and does not necessarily mean that the order has already shipped. In one example the item purchased is an electronic gift card, and the "order_confirmation" indicates that the order has been completed by mailing a gift card redemption code to a recipient.

Having received the payment and order responses 106, 110, the composite software application 12 transmits a purchase confirmation to the client device 14 that includes the following parameters:

"cust_ID"; and

"purchase_confirmation" which indicates that the purchase request 102 was successful.

In prior art baseline testing systems, only the inbound request 102 and corresponding response 112 would be recorded. Although the recorded responses may depend on outgoing requests (e.g., as the response 112 depends on responses 106, 110), the outgoing requests at issue were not recorded in baseline test cases. As a result, regression testing against a recorded baseline test case would not consider whether the outbound requests transmitted to application components were correct.

Figure 4:
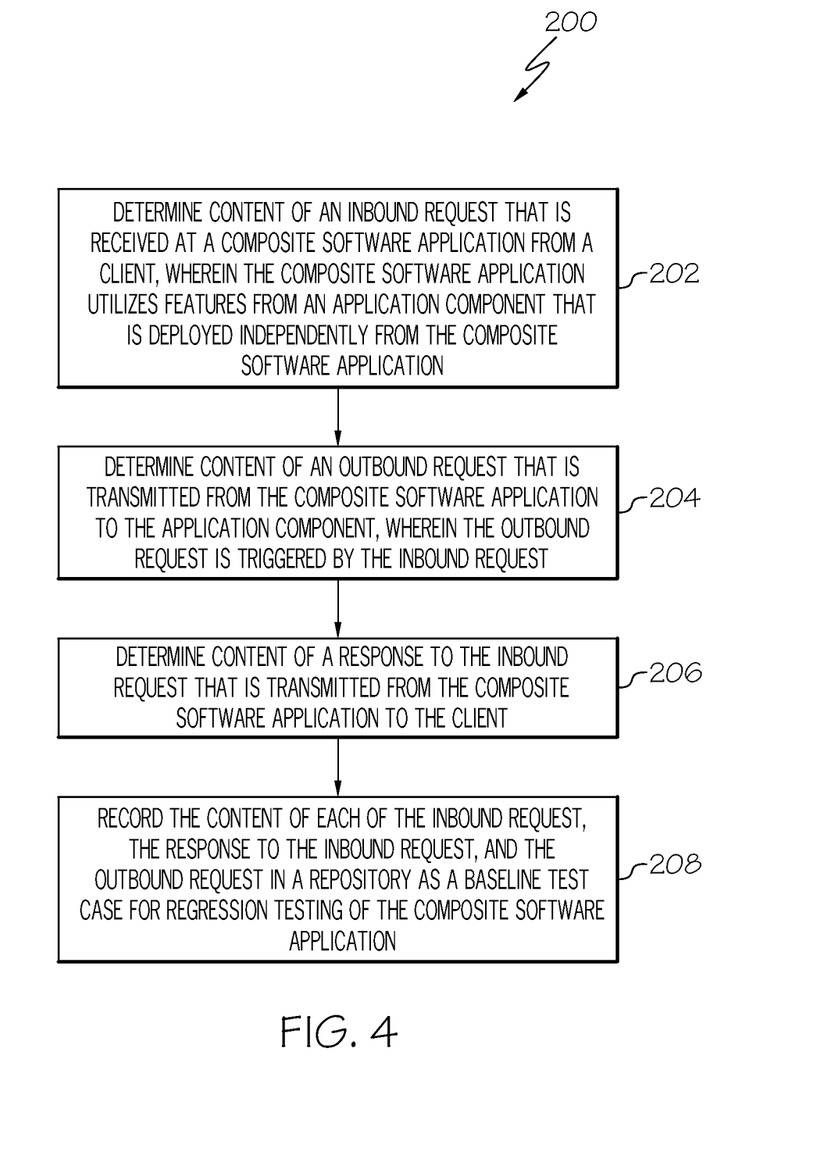
FIG. 4 illustrates an example computer-implemented method for creating a baseline test case for regression testing of a composite software application.

FIG. 4 illustrates an example computer-implemented method 200 for creating a baseline test case for regression testing of a composite software application that overcomes these shortcomings. A computer determines content of an inbound request that is received at a composite software application 12 from a client 14 (block 202), wherein the composite software application 12 utilizes features from an application component that 18 is deployed independently from the composite software application 12. The computer determines content of an outbound request that is transmitted from the composite software application 12 to the application component 18, wherein the outbound request is triggered by the inbound request (block 204). The computer determines content of a response to the inbound request that is transmitted from the composite software application 12 to the client 14 (block 206). The computer also records the content of each of the inbound request, the response to the inbound request, and the outbound request in a repository as a baseline test case for regression testing of the composite software application 12 (block 208).

Figure 5:
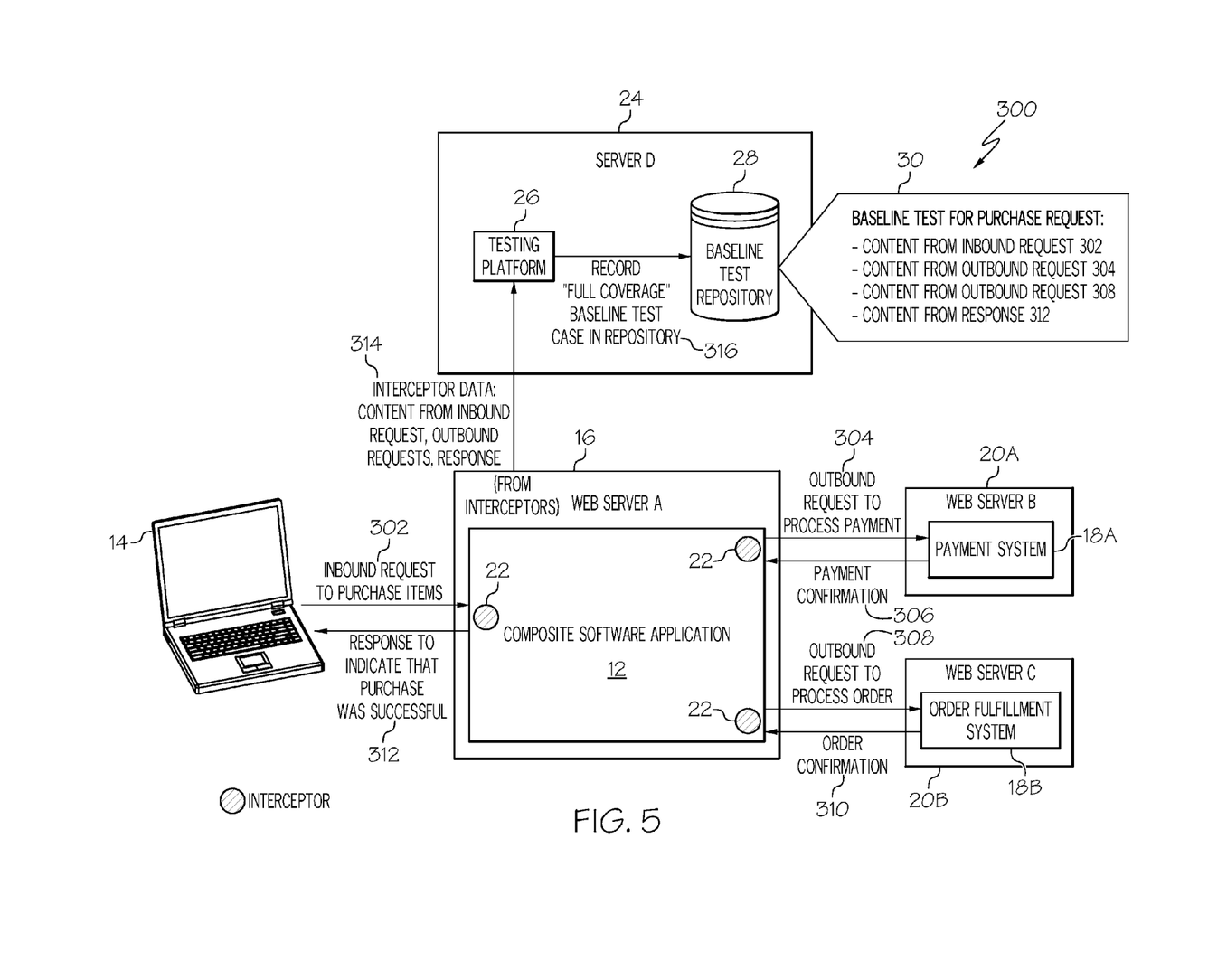
FIG. 5 illustrates an embodiment of the method of FIG. 4.

FIG. 5 illustrates an embodiment 300 of the method 200 of FIG. 4. Items 302-310 in FIG. 5 show the same messaging as items 102-110 in FIG. 2, so these items will not be discussed in detail again. Notably though, in FIG. 5 "interceptors" 22 intercept copies of selective ones of the messages. In particular, interceptors 22 intercept copies of the inbound request 302, the outbound request 304, and the outbound request 308. Some example interceptor tools that could be used for such intercepting include Pathfinder (from CA TECHNOLOGIES), JVisualVM, and BTrace. In some embodiments, the interceptors are pieces of code inserted into protocol API code at runtime and are executed when a request is sent. For example, when a given API is being invoked with a number of parameters, the same parameters could be sent to an interceptor API to record a copy of parameters, as well as an indication of which API the parameters are being sent to.

The webserver 16 sends interceptor data to a testing platform 26 on a separate webserver 24 (314). This interceptor data includes content from the inbound request 302, the outbound requests 304, 306, and the response 312. The transmission of the interceptor data 314 enables the server 24 accessing the testing platform 26 to determine content of the inbound request 302, the outbound requests 304, 308, and the response 312 (see blocks 202-206 of FIG. 4). The testing platform then records a baseline test case 30 in a baseline test repository 28 (316). The recorded baseline test case 30 includes the intercepted content of each of the inbound request 302, the outbound requests 304, 308, and the response 312 (see block 208 of FIG. 4). This content could include the entirety of each request/response, or any portion of each request/response. For example, the content could include each of the parameters discussed above in connection with FIG. 3, for example, for the requests 302, 304, 308, and response 312.

The recorded baseline test case 30 may include an indication of the protocols used for the requests 302, 304, 308, and response 312 (e.g., a n indication of the protocols used by the interceptors 22 use to intercept these items). For example, the baseline test could indicate that various ones of the messages occur through a Java Message Service (JMS), a web service, a Servlet, Enterprise JavaBeans (EJB), Java Database Connectivity (JDBC), Remote Method Invocation (RMI), raw socket communication, a Representational State Transfer (RESTful) API, etc.

The baseline test case 30 may also store an indication of the version of the composite software application 12 from which the baseline test case 30 was created. This could be useful in performing regression testing, as it may be desirable to know what version of the composite software application 12 regression testing is being performed against.

Notably, the baseline test case 30 does not need to include the responses 306, 310 sent from the application components 18A, 18B to the composite software application. Although the recorded response 312 may ultimately depend on those intermediate responses 306, 310, the responses 306, 310 themselves are not required to be included in the baseline test case 30. One reason for this is that the responses 306, 310 are largely indicative of the behavior of the respective application components 18A, 18B which are themselves not under test. Instead, it is the composite software application 12 for which testing is desired. Another reason for this is that application components 18 may change between versions of a composite software application 12, and so variations in their responses (e.g., items 104, 108 of FIG. 2) may be of less interest in a regression test of just the behavior of composite software application 12 itself.

Thus, in some embodiments, determining content of an inbound request (block 202 of FIG. 4) can include receiving an intercepted copy of the inbound request from computing device 16 hosting the composite software application 12. Similarly, determining content of an outbound request may include receiving an intercepted copy of the outbound request from the computing device 16 hosting the composite software application 12 (block 204 of FIG. 4). Also, determining content of the response to the inbound request may include receiving an intercepted copy of the response to the inbound request from the computing device 16 hosting the composite software application 12 (block 206 of FIG. 4).

Figure 6:
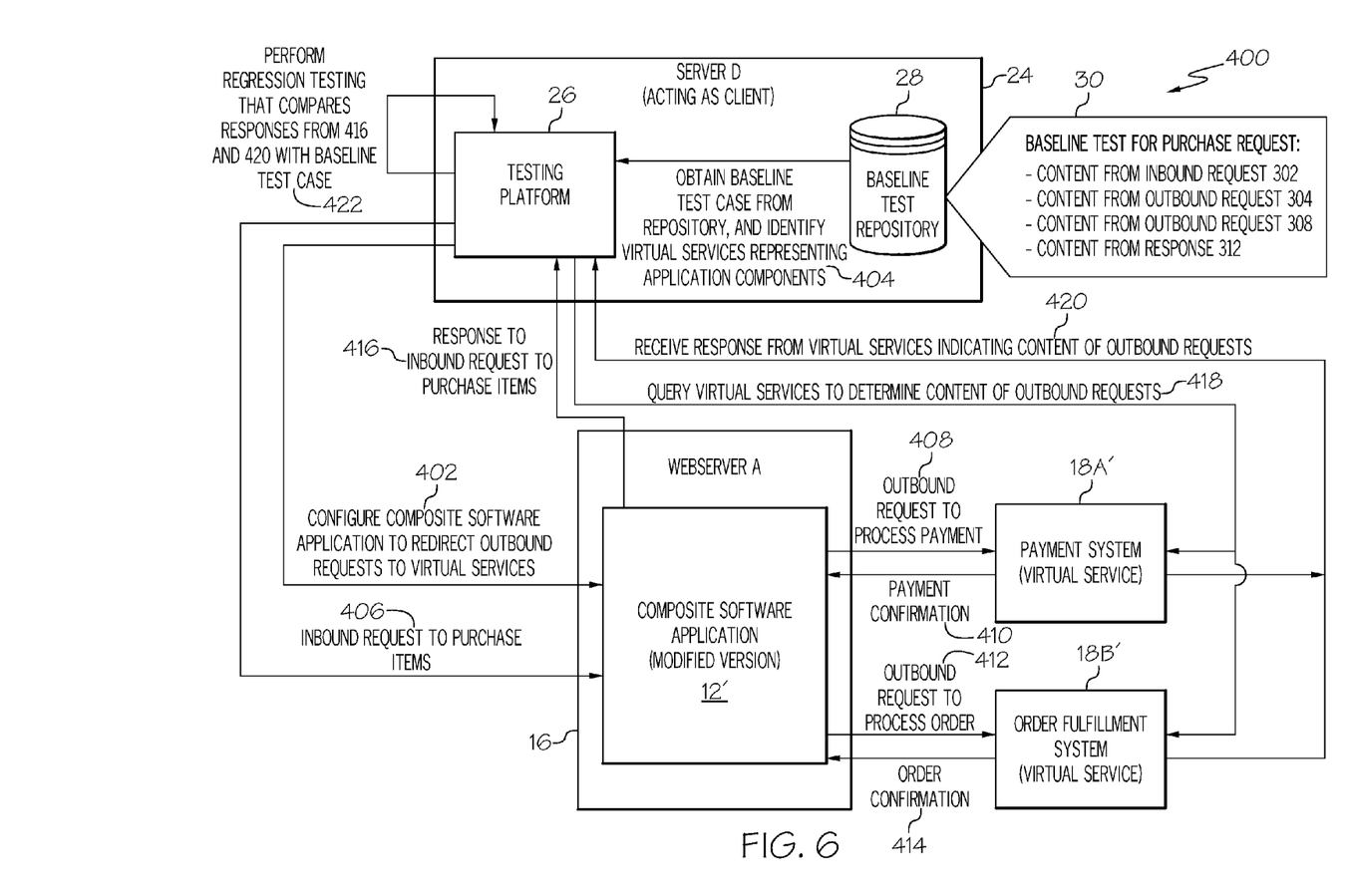
FIG. 6 illustrates performance of a regression test against the baseline test case of FIG. 5.

FIG. 6 illustrates performance 400 of a regression test for a modified version of the composite software application 12' using the baseline test case 30 of FIG. 5. In one example, the modified version could include a pending new release for which regression testing needs to be performed, such that the baseline test case is recorded on an initial version of the composite software application 12, and the regression test is performed for the modified version of the composite software application 12' which is a subsequent version.

In the embodiment of FIG. 6, the application components 18A', 18B' are virtual services, and the testing platform 26 configures the modified version of the composite software application 12' to direct its outbound requests for each non-virtualized version of an application component (18A, 18B) to a virtual service for the application component (18A', 186') (402). Virtual services will be discussed in more detail below. In one example, the configuring of item 402 is performed by changing an IP address or domain name in a configuration file of the composite software application 12' that indicates where application components can be reached.

Also, in the embodiment of FIG. 6, instead of using interceptors 22 to obtain content from outbound requests from the composite software application, the application components 18A', 18B' that are the destinations of those outbound requests are queried to obtain copies of that content. Such a configuration may be more desirable during regression testing because it is more true to the actual production environment of the composite software application 12 (where it is likely that interceptors would not be present).

The testing platform 26 obtains the recorded baseline test case 30 from the repository 28, and identifies the virtual services representing the application components implicated in the test (404). This identification could correspond to identifying the virtual services in a mapping table, or the configuration file discussed above, for example. In the same or another example, the application components could be identified in metadata of the baseline test case 30.

The testing platform 26 transmits the content of the inbound request 302 to the composite software application 12 as an additional inbound request (402). The inbound request 302 of FIG. 5 and the additional inbound request 406 of FIG. 6 invoke a same function of the composite software application 12 (e.g., a same API). In FIG. 6, the server 24 supporting the testing platform 26 acts as the client, instead of one of the client devices 14 acting as a client.

The modified version of the composite software application 12' transmits an outbound request (408) to payment system 18A' (a virtual service), and receives confirmation (410) that the payment was successful. The composite software application 12' also transmits an outbound request (412) to order fulfillment system 18B' (a virtual service), and receives a successful confirmation (414) (e.g., indicating that an order confirmation email has been sent to the server 24 which is acting as a client). The composite software application 12' transmits a response to the testing platform 26 (416) that responds to the request of 402. The testing platform 26 queries each of the virtual service application components 18A', 18B' to determine the content of the outbound requests 408, 412, and receives responses in return (420). The testing platform 26 then performs regression testing (422) that compares the responses from 416 and 420 with the recorded baseline test case 30.

Thus, in the embodiment of FIG. 6, the computing device 24 supporting the testing platform 26 sends the content of the inbound request 302 to a modified version of the composite software application 12' as an additional inbound request 402. Also, the computing device 24 determines content of an additional outbound request 408 that is transmitted from the modified version of the composite software application 12' to the application component 18A', wherein the additional outbound request 408 is triggered by the additional inbound request 402 (and does the same for outbound request 412). The computing device 24 also determines content of the response 406 to the additional inbound request 402 that is transmitted from the modified version of the composite software 12', and compares (422) the content of each of the response to the additional inbound request 406 and the additional outbound request 408 to the baseline test case 30 as a regression test for the modified version of the composite software application 12'.

Unlike in FIG. 5, where interceptors 22 were used to intercept copies of the inbound request 302, outbound requests 304, 308, and response 312, in FIG. 6 interceptors 22 are not used. Instead, for each outbound request 408, 412, the computing device 24 identifies which application component is indicated as a recipient of the outbound request in the baseline test case 30, and queries the identified application component to determine what outbound request was received from the modified version of the composite software application 12' based on the additional inbound request 302.

In some embodiments, the regression test 422 is performed as part of automated regression testing for the modified version of the composite software application 12', with the automated regression testing comprising performing a plurality of baseline comparisons for the modified version of the composite software application 12' based on a plurality of baseline test cases stored in the repository 28 for the composite software application.

Service virtualization emulates the behavior of application components that may be needed in order to complete end-to-end transactions of a composite software application. For example, in the e-commerce example discussed above, submitting payment is an integral part of processing an order, and without a payment system a purchase request would fail. Instead of virtualizing entire systems (e.g., the entire composite software application and all of its constituent application components), service virtualization may be used to virtualize only specific slices of dependent behavior critical to the execution of development and testing tasks. This may include some or all of the features of an application component, for example.

Virtualization can be useful because actual production systems need not be disturbed during testing. For example, when processing test e-commerce orders, no actual credit card needs to be charged. Also, constraints to the production environment application components can be removed. Such constraints may include an application component being temporarily unavailable, or being still under development. By using service virtualization, the availability of the actual application components is not needed because the behavior of the application component is captured in a virtual service. Virtualization can also be useful because it can avoid reliance on stub objects or mock objects. Less effort is required to generate a virtual service than is required to write code for programming a stub or a mock object to mimic an application component. Virtualization also allows an application component to be executed in a different process space, such that inter-process communication is used to communicate between the composite software application 12 and application component 18 (whereas a stub or mock would be executed in the same process space without inter-process communication). One example product for creating virtual services is "CA Service Virtualization" from CA TECHNOLOGIES. Of course, it is understood that this is only an example, and that other virtualization products could be used to generate a virtual service.

Although virtual services have only been discussed in connection with execution of baseline test cases (and not generation of baseline test cases), it is understood that virtual services could also be used during baseline test generation (e.g., as shown in FIG. 5). In such embodiments, the application components 18A, 18B that receive requests 304, 308 in FIG. 5 could also be virtual services. In these embodiments the initial version of the composite software application 12 (i.e., the version used for generating baseline test cases) could also be configured to direct its outbound requests for non-virtualized versions of application components to their respective virtual service counterparts.

As shown in FIGS. 2 and 6, in some embodiments the method 200 (and related items 402, 406, 418, 422) are implemented by a first computing device (server 24), the composite software application 12 is hosted on a second computing device (server 16) that is different from the first computing device, the application component 18 is hosted on a third computing device (server 20A) that is different from both the first computing device and the second computing device. Of course, different hardware configurations could be possible. For example, application components may be hosted together on a single server and/or may be hosted on the server 24 (e.g., as separate virtual machines having their own IP addresses). In one example, application components may be hosted on the same computing device 16 upon which the composite software application 12 is supported, as long as inter-process communication is used and the application components are still deployed independently.

FIGS. 5 and 6 above show that in a first mode of operation (FIG. 5), content of outbound requests to application components are determined by receiving an intercepted copy of the outbound requests transmitted to the application components; and in a second mode of operation (FIG. 6), content of outbound requests to application components are determined by querying the application components to determine what outbound requests have been received by the application components (i.e., instead of relying on interceptors 22).

Figure 7:
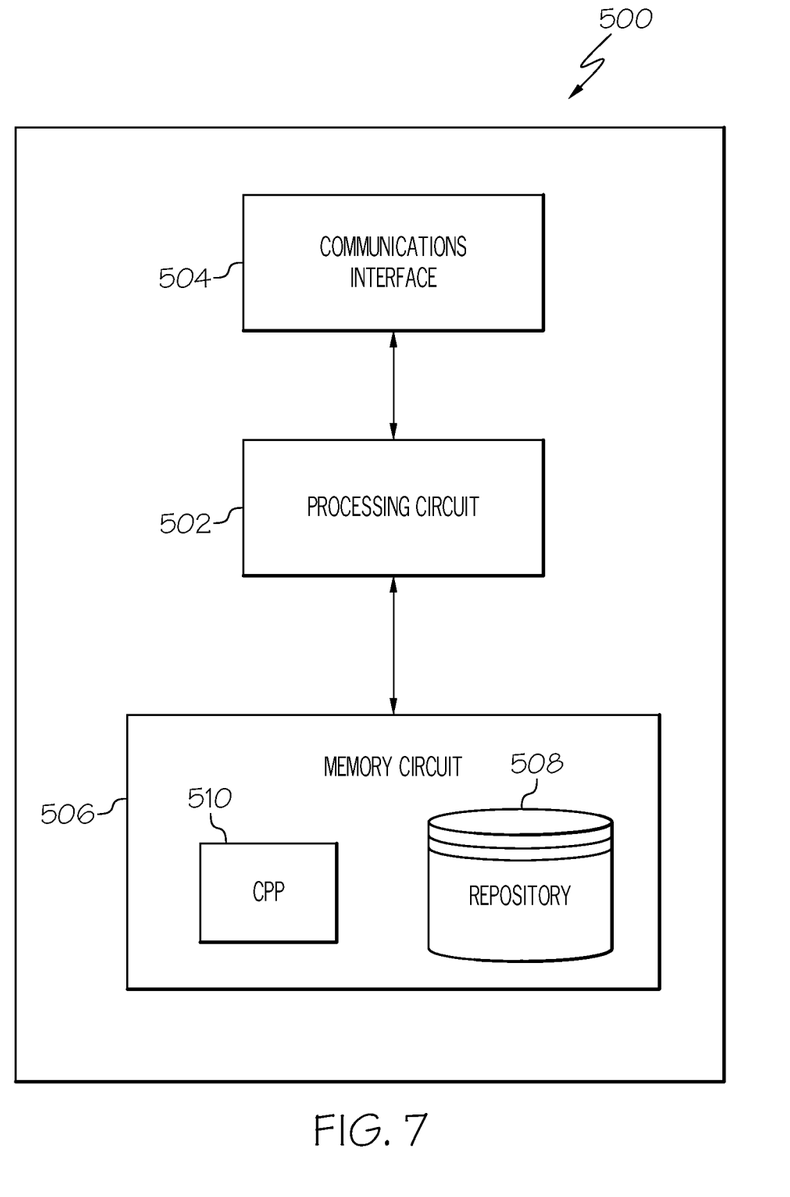
FIG. 7 illustrates an example computing device configured to create baseline test cases for regression testing of a composite software application.

FIG. 7 illustrates an example computing device 500 configured to create baseline test cases for regression testing of a composite software application 12. The computing device 500 includes a processing circuit 502, a communications interface 504, and memory circuit 506. The communication interface 504 is configured to communicate with composite software application 12. The processing circuit 502 is communicatively connected to the communication interface 504, and is configured to determine content of an inbound request that is received at the composite software application 12 from a client 14, wherein the composite software application 12 utilizes features from an application component 18 that is deployed independently from the composite software application 12. The processing circuit 502 is further configured to determine content of an outbound request that is transmitted from the composite software application 12 to the application component 18, wherein the outbound request is triggered by the inbound request. The processing circuit 502 is further configured to determine content of a response to the inbound request that is transmitted from the composite software application 12 to the client 14; and to record the content of each of the inbound request, the response to the inbound request, and the outbound request in a repository 28 as a baseline test case 30 for regression testing of the composite software application 12. The computing device 500 may be further configured to implement any of the techniques discussed herein.

The memory circuit 506 is a computer readable storage medium that includes a repository 508 of baseline test cases for one or more composite software applications. Of course, it is also possible that the repository could be stored on a separate computing device (e.g., an external database). In one embodiment, the computer readable storage medium of the memory circuit 506 includes a computer program product 510 having computer readable program code embodied therewith, with the computer readable program code comprising:

computer readable program code configured to determine content of an inbound request that is received at a composite software application from a client, wherein the composite software application utilizes features from an application component that is deployed independently from the composite software application;

computer readable program code configured to determine content of an outbound request that is transmitted from the composite software application to the application component, wherein the outbound request is triggered by the inbound request;

computer readable program code configured to determine content of a response to the inbound request that is transmitted from the composite software application to the client; and computer readable program code configured to record the content of each of the inbound request, the response to the inbound request, and the outbound request in a repository as a baseline test case for regression testing of the composite software application (e.g., in repository 508).

The generation of a baseline test cases that includes not only inbound requests and their responses, but also outbound requests, provides for more robust regression testing. These could be considered "full coverage" baseline test cases, whereas in the prior art only partial coverage baseline test cases were used in automated regression testing (e.g., those that included only an incoming request and its response, but omitted outbound requests such as request 104, 108 of FIG. 2). Since composite applications rely upon application components, many of the requests to a given composite application will generate related outbound requests that are transmitted to the one or more application components. The techniques discussed herein enable baseline testing of those outbound requests in addition to testing the inbound request and its response (e.g., items 102, 112 of FIG. 2). The focus need not be on how the application component responds to the request (e.g., items 106, 110 of FIG. 2), because the application components may be third party components, and may not change between versions of the composite software application. Rather, since it is the composite software application 12 itself that is being tested, only the behavior of that application 12 needs to be recorded in the "full coverage" baseline test cases.

A number of variations to the techniques described above could be implemented. For example, instead of using virtual services only for executing a baseline test (FIG. 6), it is understood that service virtualization could be also be used for generating a baseline test (FIG. 5). Alternatively, if desired, virtualization could be avoided entirely and a non-virtualized application component could be used for both test recording and execution.

Although the various messages discussed above have been presented in a particular order, it is understood that this order could vary. For example, the retrieval of a baseline test (item 404 in FIG. 6) could occur before the configuring of the composite software application to redirect outbound requests to virtual services (item 402 in FIG. 6). Also a number of items could happen concurrently. For example, in some embodiments the transmission of response 312 could occur concurrently with the transmission of interceptor data 314 (see FIG. 5).

Additionally, although third party application components 18 have been discussed, it is understood that application components need not be operated by a third party, and could be created and/or operated by a same vendor that is operating the composite software application.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A computer-implemented method comprising:
   determining content of an inbound request that is received at a composite software application from a client, wherein the composite software application utilizes features from an application component that is deployed independently from the composite software application;
   determining content of an outbound request that is transmitted from the composite software application to the application component, wherein the outbound request is triggered by the inbound request;
   determining content of a response to the inbound request that is transmitted from the composite software application to the client; and
   recording the content of each of the inbound request, the response to the inbound request, and the outbound request in a repository as a baseline test case for regression testing of the composite software application.

2. The computer-implemented method of claim 1:
   wherein determining content of the inbound request comprises receiving an intercepted copy of the inbound request from a computing device hosting the composite software application;
   wherein determining content of the outbound request comprises receiving an intercepted copy of the outbound request from the computing device hosting the composite software application; and
   wherein determining content of the response to the inbound request comprises receiving an intercepted copy of the response to the inbound request from the computing device hosting the composite software application.

3. The computer-implemented method of claim 1, further comprising:
   sending the content of the inbound request to a modified version of the composite software application as an additional inbound request;
   determining content of an additional outbound request that is transmitted from the modified version of the composite software application to the application component, wherein the additional outbound request is triggered by the additional inbound request;
   determining content of a response to the additional inbound request that is transmitted from the modified version of the composite software; and
   comparing the content of each of the response to the additional inbound request and the additional outbound request to the baseline test case as a regression test for the modified version of the composite software application.

4. The computer-implemented method of claim 3, wherein determining content of the additional outbound request that is transmitted from the modified version of the composite software application to the application component comprises:
   identifying which application component is indicated as a recipient of the outbound request in the baseline test case; and
   querying the identified application component to determine what outbound request was received from the modified version of the composite software application based on the additional inbound request.

5. The computer-implemented method of claim 3, wherein the regression test is performed as part of automated regression testing for the modified version of the composite software application, the automated regression testing comprising performing a plurality of baseline comparisons for the modified version of the composite software application based on a plurality of baseline test cases stored in the repository for the composite software application.

6. The computer-implemented method of claim 3, wherein the application component that receives the additional outbound request is a virtual service, the computer-implemented method further comprising:
   configuring the modified version of the composite software application to direct its outbound requests for a non-virtualized version of the application component to the virtual service.

7. The computer-implemented method of claim 6, wherein the application component that receives the outbound request is also a virtual service, the computer-implemented method further comprising:
   configuring the composite software application to direct its outbound requests for the non-virtualized version of the application component to the virtual service.

8. The computer-implemented method of claim 1, wherein the inbound request received at the composite software application is received via a graphical user interface (GUI) of the composite software application.

9. The computer-implemented method of claim 1:
wherein the computer-implemented method is implemented by a first computing device;
wherein the composite software application is hosted on a second computing device that is different from the first computing device; and
wherein the application component is hosted on a third computing device that is different from both the first computing device and the second computing device.

10. The computer-implemented method of claim 1:
wherein in a first mode of operation, content of outbound requests to the application component is determined by receiving an intercepted copy of the outbound requests transmitted to the application component; and
wherein in a second mode of operation, content of outbound requests to the application component is determined by querying the application component to determine what outbound requests have been received by the application component.

11. A computing device comprising:
a communication interface configured to communicate with a composite software application; and
a processing circuit communicatively connected to the communication interface and configured to:
determine content of an inbound request that is received at the composite software application from a client, wherein the composite software application utilizes features from an application component that is deployed independently from the composite software application;
determine content of an outbound request that is transmitted from the composite software application to the application component, wherein the outbound request is triggered by the inbound request;
determine content of a response to the inbound request that is transmitted from the composite software application to the client; and
record the content of each of the inbound request, the response to the inbound request, and the outbound request in a repository as a baseline test case for regression testing of the composite software application.

12. The computing device of claim 11:
wherein to determine content of the inbound request, the processing circuit is configured to receive an intercepted copy of the inbound request from a computing device hosting the composite software application;
wherein to determine content of the outbound request, the processing circuit is configured to receive an intercepted copy of the outbound request from the computing device hosting the composite software application; and
wherein to determine content of the response to the inbound request, the processing circuit is configured to receive an intercepted copy of the response to the inbound request from the computing device hosting the composite software application.

13. The computing device of claim 11, wherein the processing circuit is further configured to:
send the content of the inbound request to a modified version of the composite software application as an additional inbound request;
determine content of an additional outbound request that is transmitted from the modified version of the composite software application to the application component, wherein the additional outbound request is triggered by the additional inbound request;
determine content of a response to the additional inbound request that is transmitted from the modified version of the composite software; and
compare the content of each of the response to the additional inbound request and the additional outbound request to the baseline test case as a regression test for the modified version of the composite software application.

14. The computing device of claim 13, wherein to determine content of the additional outbound request that is transmitted from the modified version of the composite software application to the application component, the processing circuit is configured to:
identify which application component is indicated as a recipient of the outbound request in the baseline test case; and
query the identified application component to determine what outbound request was received from the modified version of the composite software application based on the additional inbound request.

15. The computing device of claim 13, wherein the regression test is performed as part of automated regression testing for the modified version of the composite software application, and wherein the processing circuit is configured to perform the automated regression testing by performing a plurality of baseline comparisons for the modified version of the composite software application based on a plurality of baseline test cases stored in the repository for the composite software application.

16. The computing device of claim 13, wherein the application component that receives the additional outbound request is a virtual service, and the processing circuit is further configured to:
configure the modified version of composite software application to direct its outbound requests for a non-virtualized version of the application component to the virtual service.

17. The computing device of claim 16, wherein the application component that receives the outbound request is also a virtual service, and the processing circuit is further configured to:
configure the composite software application to direct its outbound requests for the non-virtualized version of the application component to the virtual service.

18. The computing device of claim 11, wherein the inbound request received at the composite software application is received via a graphical user interface (GUI) of the composite software application.

19. The computing device of claim 11:
wherein the computing device is a first computing device;
wherein the composite software application is hosted on a second computing device that is different from the first computing device; and
wherein the application component is hosted on a third computing device that is different from both the first computing device and the second computing device.

20. The computing device of claim 11:
wherein in a first mode of operation, the processing circuit is configured to determine content of outbound requests to the application component by receiving an intercepted copy of the outbound requests transmitted to the application component; and wherein in a second mode of operation, the processing circuit is configured to determine content of outbound requests to the application component by querying the application component to determine what outbound requests have been received by the application component.

21. A computer program product comprising:

a computer readable storage medium having computer readable program code embodied therewith, the computer readable program code comprising:

computer readable program code configured to determine content of an inbound request that is received at a composite software application from a client, wherein the composite software application utilizes features from an application component that is deployed independently from the composite software application;

computer readable program code configured to determine content of an outbound request that is transmitted from the composite software application to the application component, wherein the outbound request is triggered by the inbound request;

computer readable program code configured to determine content of a response to the inbound request that is transmitted from the composite software application to the client; and computer readable program code configured to record the content of each of the inbound request, the response to the inbound request, and the outbound request in a repository as a baseline test case for regression testing of the composite software application.

* * * * *